United States Patent [19]

Satgurunathan et al.

[11] Patent Number: 5,656,685
[45] Date of Patent: Aug. 12, 1997

[54] AQUEOUS COATING COMPOSITIONS

[75] Inventors: Rajasingham Satgurunathan, Kingsley; John Christopher Padget, Frodsham; John Gerard Carey, Warrington, all of England

[73] Assignee: Zeneca Limited, London, England

[21] Appl. No.: 325,205

[22] PCT Filed: May 12, 1993

[86] PCT No.: PCT/GB93/00969

§ 371 Date: Oct. 21, 1994

§ 102(e) Date: Oct. 21, 1994

[87] PCT Pub. No.: WO93/23486

PCT Pub. Date: Nov. 25, 1993

[30] Foreign Application Priority Data

May 15, 1992 [GB] United Kingdom ............... 9210450

[51] Int. Cl.[6] .......................... C08K 3/20; B32B 27/06
[52] U.S. Cl. .......................... 524/460; 524/458; 524/504; 428/480; 428/522
[58] Field of Search ............... 524/460, 458, 524/504; 428/480, 522

[56] References Cited

U.S. PATENT DOCUMENTS

| | | | |
|---|---|---|---|
| 4,554,212 | 11/1985 | Diefenbach et al. | 524/458 |
| 4,739,004 | 4/1988 | Sekmakas et al. | 524/458 |
| 4,806,590 | 2/1989 | Padget et al. | 524/568 |

*Primary Examiner*—Kriellion S. Morgan
*Attorney, Agent, or Firm*—Cushman Darby & Cushman IP Group Pillsbury Madison & Sutro LLP

[57] ABSTRACT

An aqueous crosslinkable coating composition comprising an aqueous dispersion of: (A) at least one copolymer, said copolymer being obtainable or derived from the addition polymerization of 2 or more olefinically unsaturated monomers and bearing lateral carboxyl groups which are provided at least in part by polymerized units in said copolymer of a monomer of formula: $CH_2=CR^1-Q-CO_2H$, where $R^1$ is H or lower alkyl of 1 to 5 carbon atoms and Q is a non carboxy-containing spacer group providing a spacer chain of a least 3 atoms, and (B) at least one carboxyl-reactive material for providing crosslinking during and/or after coating formation from the composition in which the polymer-bound carboxyl groups provided by the monomer of formula take part, and wherein the components (A) and (B) are provided by different and/or the same substance(s).

16 Claims, No Drawings

AQUEOUS COATING COMPOSITIONS

This is a 371 of PCT/GB/93/00969 filed May 12, 1993.

The present invention relates to an aqueous crosslinkable coating composition containing a certain carboxyl-functional copolymer derived from the polymerisation of two or more olefinically unsaturated monomers.

The provision of polymeric coatings on a variety of substrates, e.g. for protective, decorative, adhesive or sealant purposes, is a well established field of technology. It is well known to improve the performance of such coatings by causing them to become crosslinked (cured) during and/or after coating formation from the composition and various crosslinkable aqueous polymer compositions for achieving such an objective have been used or proposed.

One such type of crosslinkable composition incorporates an aqueous dispersion of a carboxyl-functional polymer made from two or more olefinically unsaturated monomers, such a composition including a carboxyl-reactive material that will effect a crosslinking reaction involving the carboxyl groups of the polymer and the material during and/or after film formation. For example aqueous crosslinkable compositions which include carboxyl-functional polymers and polyepoxy compounds or certain multivalent metal compounds have been proposed, in which crosslinking occurs respectively by reaction of the carboxyl groups with epoxide groups of the polyepoxy compound or by the carboxyl groups taking part in ionic crosslinking with metal ions from the metal compound. Also proposed have been aqueous crosslinkable compositions which include carboxyl-functional polymers and polymers having hydroxyl groups wherein crosslinking occurs by an esterification reaction involving the carboxyl and hydroxyl groups.

The source of the carboxyl groups in the polymers of such crosslinkable compositions has hitherto been widely-used α-β olefinically unsaturated acids such as, in particular, acrylic acid, methacrylic acid and (sometimes) itaconic acid, the acid(s) being used as one of the monomers in the polymerisation so as to provide polymerised units thereof in the copolymer.

We have now discovered that by selecting certain olefinically unsaturated carboxylic acid-containing monomers as the source of at least part of the carboxyl group content of the polymer a coating composition of significantly improved performance is unexpectedly achieved.

According to be present invention there is provided an aqueous crosslinkable coating composition comprising an aqueous dispersion of:

(A) at least one copolymer, said copolymer being obtainable or derived from the addition polymerisation of 2 or more olefinically unsaturated monomers and bearing lateral carboxyl groups which are provided at least in part by polymerised units in said copolymer of a monomer of formula:

$$CH_2=CR^1-Q-CO_2H \quad (1)$$

where $R^1$ is H or lower alkyl of 1 to 5 carbon atoms (preferably H) and Q is a non carboxyl-containing spacer group providing a spacer chain of at least 3 (preferably at least 4) atoms, said monomer of Formula (1) preferably being β-carboxy ethyl acrylate, and (B) at least one carboxyl-reactive material for providing crosslinking during and/or after coating formation from the composition in which the polymer-bound carboxyl groups provided by the monomer of Formula (1) take part, and wherein the components (A) and (B) are provided by different and/or the same substance(s).

There is also provided according to the invention a method of coating a substrate which comprises applying thereto an aqueous crosslinkable composition defined above and allowing or causing the aqueous phase to becomed removed to form a coating on the substrate.

There is further provided according to the invention a crosslinked coating formed from an aqueous crosslinkable coating composition as defined above.

There is further provided according to the invention a coated substrate, wherein the coating on said substrate has been derived or is obtainable from an aqueous crosslinkable coating composition as defined above.

By an aqueous dispersion of the components (A) and (B) is meant herein a dispersion of the components in a liquid carrier medium of which water in the principal component (at least 50% by weight, more usually at least 80% by weight of the carrier medium). Minor amounts of organic liquids may optionally be present. Each component my be dispersed as an aqueous emulsion, suspension or solution. However, the at least one polymer of component (A) is usually in the form of colloidally dispersed particles, i.e. in the form of an aqueous latex.

It has thus been found that the crosslinkable coating compositions of the invention, which include a carboxyl-functional polymer as defined in which at least part of the lateral (i.e. chain-pendant) carboxyl groups thereof are derived by the inclusion of a monomer of formula (1) in the polymerisation to form the copolymer, rather than solely from hitherto conventionally-employed unsaturated acids such as acrylic and methacrylic acid, allow significantly enhanced crosslinking reactions to occur on coating formation, in terms e.g. of the rate of crosslinking, the temperature at which it effectively occurs (often at ambient or slightly elevated temperatures, say up to 50° C., although higher temperatures can be used if desired) and the final extent of cure. Thus monomers of Formula (1) in polymerised form can be used to improve crosslinking during the formation of surface coatings and to improve the durability of a surface coating.

With regard to the carboxyl-containing monomer of formula (1), $R^1$ is preferably H or methyl, and is more preferably H. The spacer group Q preferably provides a spacer chain of at most 8 atoms, and more preferably at most 6 atoms. A preferred range for the spacer chain of Q is therefore 3 to 8 atoms, more preferably 4 to 8 (4 to 6) atoms. The spacer chain of the atoms of Q can all be of the same type, e.g. C atoms as in a polyalkylene chain $-(CH_2)_n$ where n is at least 3. More usually, however, the atoms of the spacer chain are of two or more kinds, for example carbon and oxygen, or carbon and nitrogen.

It is preferred that Q provides a group immediately adjacent to the double bond $CH_2=CR^1-$ which activates this double bond to polymerisation, e.g. a group such as $-C(=O)-O-$, $-C(=O)-NH-$, $-S(=O)_2-$, or $-S(=O)-$.

It is particularly preferred that the spacer group Q is of the formula:

where X is $-O-$ or $-NH-$ and m is at least 1, more preferably 2 or 3.

It is especially preferred in the present invention that the unsaturated carboxyl-containing monomer of formula (1) is β-carboxy ethyl acrylate, which has the formula:

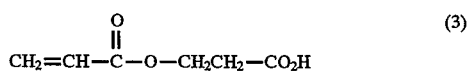

$$CH_2=CH-\overset{\overset{O}{\|}}{C}-O-CH_2CH_2-CO_2H \quad (3)$$

The level of the at least one monomer of formula (1) used for the preparation of the carboxyl-functional copolymer will usually be within the range of from 1 to 25 weight %, more usually 5 to 10 weight %, based on the total weight of monomers used in the polymerisation reaction. While it is preferably the sole source of carboxyl-functionality in the resulting copolymer, it may optionally be used in conjunction with one or more other carboxyl-containing or carboxyl-providing monomers such as acrylic acid, methacrylic acid, itaconic acid, fumaric acid, maleic acid, and maleic anhydride. The level of the at least one monomer of formula (1) in the carboxylic acid monomer content used for the polymerisation will usually be within the range of from 25 to 100 weight % (more usually 50 to 100 weight % and particularly 70 to 100 weight %) based on the total weight of carboxylic acid monomers used in polymerisation.

The level of other, non carboxyl, olefinically unsaturated monomer or monomers used in polymerisation will usually be within the range of from 75 to 99 weight %, more preferably from 90 to 95 weight % based on the total weight of monomers used for the polymerisation. Typically, the level of said at least one monomer of formula (1) will be the range of from 1 to 25 weight % based on the total weight of monomers used for the polymerisation, the level of any other carboxylic acid monomer(s) in the range of 0 to 12.5 weight %, and the level of other, non carboxyl, olefinically unsaturated monomer(s) in the range of from 75 to 99 weight %.

Examples of non carboxylic acid olefinically unsaturated monomers which may be used in the polymerisation to form the copolymer of component (A) include conjugated dienes; styrene or substituted styrenes; vinyl halides such as vinylidene chloride and vinyl chloride; olefinically unsaturated amides; vinyl esters; vinyl ethers; olefinically unsaturated nitriles; heterocyclic vinyl compounds; and esters of acrylic acid and methacrylic acid of formula:

$$CH_2=CR^2CO_2R^3 \quad (4)$$

where $R^2$ is H or methyl and $R^3$ is optionally substituted (e.g. optionally halo substituted) alkyl or cycloalkyl of 1 to 20 carbon atoms (more preferably 1 to 8 carbon atoms) but which excludes acid-containing groups. More specific examples of such monomers include (chloro)akyl esters such as methyl acrylate, ethyl acrylate, n-propyl acrylate, n-butyl acrylate, n-octyl acrylate, 2-ethylhexyl acrylate, lauryl acrylate, isopropyl acrylate, methyl α-chloroacrylate, ethyl α-chloroacrylate, n-propyl α-chloroacrylate, n-butyl α-chloroacrylate, β-chloroethyl acrylate, β-chloropropyl acrylate, β chlorobutyl acrylate, fluorinated acrylates and methacrylates (such as the fluoro analogues of the above chloroacrylates), methyl methacrylate, ethyl methacrylate, n-propyl methacrylate, isopropyl methacrylate, n-butyl methacrylate, 2-ethylhexy methacrylate, diethyl maleate, diethyl fumarate; vinyl esters such as allyl acetate, allyl chloroacetate, methallyl acetate, vinyl acetate, isopropenyl acetate; halides such as vinyl chloride, vinylidene chloride, allyl chloride, 1,2-dichloropropene-2, methallyl chloride and trichloroethylene; nitriles such as acrylonitrile and methacrylonitrile; aryls such as styrene, o-methyl styrene, m-methyl styrene, p-methyl styrene, pentachlorostyrene, o-chlorostyrene, m-chlorostyrene, p-chlorostyrene and p-cyanostyrene; conjugated dienes or chlorodienes such as butadiene and chloroprene and vinyl-substituted heterocyclic imines such as 2-vinyl-pyridine and vinyl carbazole. In certain embodiments (see later) the non acidic olefinically unsaturated monomer can include epoxy-functional olefinically unsaturated monomers such as glycidyl methacrylate and hydroxy-functional unsaturated monomers such as hydroxyethyl acrylate and hydroxyethyl methacrylate.

The techniques for the preparation of polymers of olefinically unsaturated monomers are extremely well known in the prior art and need not be described here in very great detail. Suffice to say that they usually employ a free-radical initiated polymerisation process using a free-radical-generating initiator with (usually) appropriate heating of irradiation being employed. Such polymerisations are often effected in an aqueous medium and in particular aqueous emulsion polymerisation is often used to prepare an aqueous latex of the polymer with conventional dispersants and initiators being employed. Such a latex could be used "as is" for a composition of the invention or isolated from the aqueous medium before incorporation into the composition as another aqueous dispersion. Typical dispersants for emulsion polymerisation are e.g. anionic and/or non-ionic emulsifiers such as Na salts of dialkylsulphosuccinates, Na salts of sulphated oils, Na salts of alkyl sulphonic acids, Na, K and ammonium alkyl sulphates, $C_{22-24}$ fatty alcohols, ethoxylated fatty acids and/or fatty amides, and Na salts of fatty acid such as Na stearate and Na oleate; the amount used is usually 0.1 to 3% by weight on the weight of total monomer(s) used. Typical free radical initiators are e.g. hydrogen peroxide, persulphates such as ammonium persulphate, K persulphate and Na persulphate; redox systems may be used; the amount is generally 0.05 to 3% based on the weight of total monomers charged.

The polymer of component (A) will usually have a number average molecular weight within the range of from 1000 to $6 \times 10^6$, more usually 30,000 to 2,000,000. Its glass transition temperature (Tg) will depend primarily on the particular monomers employed (whether of the hard and/or soft type) and on their relative proportions; usually however, the Tg will be within the range of from −40° C. to 100° C.

The carboxy-reactive material of component (B) is in particular selected from polyvalent metal compounds for providing polyvalent metal ions for effecting ionic crosslinking with the carboxyl groups, polyepoxide compounds for effecting crosslinking by reaction of the epoxide groups with the carboxyl groups, and polymers having β- hydroxyester groups whereby crosslinking occurs by an esterification reaction.

The metals of the polyvalent metal compounds are in particular metals of groups IIa, IIb, IIIa, and IIb, IVa and IVb (including the transition metals), examples of which include Zn, Ca, Al, Sn, W, Zn, Sn, Be, Mg, Sr, Ba, Co, Cu, Ni and Cr, and particularly Ca, Zn and Al. The metal compounds may be simple compounds or salts such as the metal oxides, hydroxides, hydrides, carbonates, acetates, alcoholates and phenolates or complexes (which my include more than one metal) such as the metal compounds of 1,3-dicarbonyls (in particular the metal acetylacetonates and alkyl acetoacetates) and xanthogenates.

Specific examples of suitable metal compounds include CaO, ZnO, Al (acetylacetonate)$_3$, Ti (acetylacetonate)$_2$, Ca (propionate)$_2$, Zn (proprionate)$_2$, Ca (acetate)$_2$, Zn (acetate)$_2$, Ca bicarbonate, and Zn bicarbonate.

The carboxyl groups may be in the form of carboxylate anions —$CO_2$— when they take part in the ionic crosslinking, and all references herein to carboxyl groups are intended to embrace carboxylate ions as appropriate. It may, in some cases, be desirable to neutralise the carboxyl groups (by the addition of a suitable base such as ammonia) to generate the stable latices. However, this may not always be required since the counter ions of some metal compounds can exchange with the carboxyl hydrogens (ligand exchange), thereby generating carboxylate anions, automatically, without any requirement to deliberately add a base. The precise chemistry behind ionic crosslinking with carboxyl-functional polymers is nevertheless believed to be fairly complex and for more detailed teaching on the subject, one can refer to U.S. Pat. Nos. 3,308,078, 3,328,325, 3,467, 610, 3,554,790, 4,150,005, and EP-A-0373918, reference to which is incorporated herein.

The amount of polyvalent metal compound to employ will usually be within the range of 1 to 100% of the stoichiometric amount based on polymer carboxylic acid functionality, more usually, 25 to 75%.

The metal compound may be incorporated into the aqueous composition of the invention simply by dispersing it in the aqueous phase. In many cases the compound will be dissolved in the aqueous phase (to form a solution thereof); in other cases it may exist as an insoluble but well dispersed material ranging from colloidal to granular size.

A polyepoxide compound for use as component (B) is a compound having an average of two or more epoxide groups per molecule. It should of course be dispersible in the aqueous medium of the coating composition (using surfactant and/or cosolvent if required). It may be monomeric, oligomeric or polymeric in nature.

A polyepoxide compound when used in the invention is, in particular, an "epoxy resin", examples of such materials being very well known in industry and being widely available commercially (see Encyc. Polymer Science and Engineering, Vol. 6, edited Mark et al 1986; page 332 and following). Examples of the different types of such epoxy resins which may be used include cycloaliphatic epoxide resins (e.g. "Cyracure" UVR-6110, "Cyracure" UVR-6200 and "Cyracure" ERL-4299; manufacturer Union Carbide Corporation); linear aliphatic epoxide resins (e.g. "Heloxy" 5048 and "Heloxy" 5044; manufacturer Hi-Tek Polymers); water-dispersible bisphenol-A based epoxy resins (e.g. WD-510; manufacturer Hi-Tek Polymers); and low molecular weight epoxides such as triglycidyl isocyanurate TGIC (e.g. "Araldite" PT 810; manufacturer Ciba-Geigy). The incorporation of such materials in the composition may simply be effected by addition to an aqueous dispersion of the carboxyl-functional polymer.

The polyepoxide compound can also be an organic polymeric material bearing epoxide groups, particularly at least lateral epoxy groups, for example a (co) polymer bearing epoxide groups derived from the addition polymerisation of one or more olefinically unsaturated monomers. Examples of such polymers include e.g. homo and copolymers of the following epoxy-functional monomers: glycidyl acrylate or methacrylate, 3,4-epoxycyclohexylmethylacrylate or methacrylate, and allyl and vinyl esters of epoxidised aliphatic and cycloaliphatic unsaturated acids, in particular allyl glycidyl ether, and ally or vinyl 3,4-epoxycyclohexane carboxylate. The epoxy-functional addition polymer will normally be an addition copolymer and examples of suitable non-epoxy-functional comonomers which may be employed in its formation in conjunction with the epoxy-functional monomer(s) include one or more of the non-acid-functional monomers listed above for use as comonomers in the formation of the carboxylic acid-functional polymer of component (A), and in particular the esters of acrylic acid and methacrylic acid quoted in the list (of formula (4)), vinyl halides such as vinylidene chloride, and styrene and substituted styrenes.

In one particular variation of this embodiment of the invention the components (A) and (B) of the invention are provided (at least in part) by the same polymeric material, viz an addition copolymer of two or more olefinically unsaturated monomers which bears both lateral carboxyl groups (derived at least in part from a monomer of formula (1)) and lateral epoxy groups—so that a crosslinking reaction can take place by a carboxyl on one polymer molecule reacting with an epoxy group on another polymer molecule of the same polymer. This can be achieved by employing a copolymer derived from at least one monomer of formula (1) (optionally in conjunction with at least one other carboxyl-bearing olefinically unsaturated monomer), at least one olefinically unsaturated monomer bearing an epoxide group(s), and at least one olefinically unsaturated monomer which bears neither carboxyl nor epoxide groups. In this variation, the components (A) and (B) could be provided solely by such a carboxyl/epoxy-functional polymer but could also include polymers bearing only carboxyl (and no epoxy) groups and/or only epoxy (and no carboxyl) groups.

The polyepoxide compound in the composition will usually be present so as to provide a ratio of carboxyl to epoxide groups within the range of 1/10 to 5/1, more usually 1/2 to 2/1.

The component (A) and the polyepoxide of component (B) (assuming one is using a polyepoxide rather than other carboxyl-reactive material) may be brought together by simple admixture in aqueous dispersion, usually with appropriate agitation-although no doubt more complicated procedures could be devised to obtain more intimate admixture (such as conducting the polymerisation to form the polymer of component (A) in the presence of the polyepoxide compound). Where the polyepoxide is an olefinic polymer (as described above), aqueous dispersions of the polymers, preferably in the form of aqueous latices, may simply be blended together. Of course, where the components of (A) and (B) are provided wholly by a single carboxy/epoxy-functional polymer (as described above) the question of bringing the components together will not apply, because admixture will have already occurred at the molecular level as a result of copolymerisation. Such epoxy-containing compositions may also include small amounts of a catalyst (normally not in sufficient amount to take part in metal ion crosslinking itself to any significant degree), e.g. small amounts of a metal ion-providing catalyst such as Cr (acetate), $CrCl_3$, or Ferric ion complexes. However, such catalysts are not essential.

It my be mentioned that crosslinkable compositions comprising blends of aqueous latices of carboxyl-functional polymers and epoxy-functional polymers are not per se new and have been disclosed e.g. in WO 91/14715. However the use of a monomer of formula (1) for providing carboxyl groups in such compositions has not been disclosed or implied in the prior art.

As mentioned above, another preferred example of a carboxyl-reactive material for use as component (B) is an organic polymer having β-hydroxy ester groups. Such a polymer is normally an addition copolymer derived from the polymerisation of two or more olefinically unsaturated monomers which include a β-hydroxy ester monomer.

By a β-hydroxy ester monomer is meant an olefinically unsaturated monomer having the following β-hydroxy ester chemical structure:

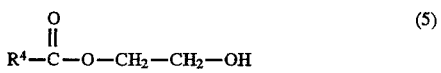

where the hydroxy group is attached to the second (β) carbon atom relative to the ester group and $R^4$ is an alkyl chain containing terminal olefinic carbon-to-carbon unsaturation. Any one of the hydrogens on the α or β carbons can be substituted with a methyl group or similar short chain alkyl group. Suitable β-hydroxy monomers can be produced by reacting an acrylic or methacrylic acid with ethylene oxide or propylene oxide to produce the β-hydroxy ester structure in conjunction with an olefinically unsaturated double bond. Beta-hydroxyl ester monomers include hydroxyl alkyl acrylates such as 2-hydroxy ethyl acrylate and methacrylate, 2-hydroxy propyl acrylate and methacrylate, and similar hydroxyl alkyl acrylates.

(Corresponding β-hydroxy amide monomers may also be used).

Crosslinking occurs in the embodiment by esterification between the carboxyl groups and the hydroxyls of the β-hydroxy ester groups of the polymer system. Crosslinking can also occur at the same time by crosslinking reactions involving only the β-hydroxy ester groups—probably via a transesterification mechanism. 2-hydroxyethyl acrylate is particularly preferred.

Other monomers which may be used in the formation of the β-hydroxy ester-functional polymer, in conjunction with the β-hydroxy ester monomer, include one or more of the non-acid-functional monomers listed above for use as comonomers in the formation of the carboxylic acid-functional polymer of component (A), and in particular the esters of acrylic acid and methacrylic quoted in the list (of formula (4)), vinyl halides such as vinylidene chloride, and styrene and substituted styrene.

In this embodiment the polymers of components (A) and (B) may be different polymers, but in one particularly preferred variation of this embodiment, the components (A) and (B) are provided (at least in part) by the same polymeric material, viz an addition copolymer of two or more olefinically unsaturated monomers which bears both lateral carboxyl groups (derived at least in part from a monomer of formula (1)) and lateral β-hydroxy ester groups. This can be achieved by employing a copolymer derived from at least one monomer of formula (1) (optionally in conjunction with at least one other carboxyl-bearing olefinically unsaturated monomer), at least one β-hydroxy ester monomer (as defined above), and at least one olefinically unsaturated monomer which bears neither carboxyl nor β-hydroxy ester groups. In this variation, the components (A) and (B) could be provided solely by such a carboxyl/β-hydroxy ester-functional polymer but could also include polymers bearing only carboxyl (and no β-hydroxy ester) groups and/or only β-hydroxy ester (and no carboxyl) groups.

The β-hydroxy ester polymer will usually be present so as to provide a ratio of carboxyl to β-hydroxy ester groups (—C(O)—OCH$_2$CH$_2$OH) within the range of from 1/15 to 15/1, more usually 1/2 to 2/1.

The component (A) and the β-hydroxy ester-functional polymer of component (B) may be brought together by simple admixture of the different dispersions, usually aqueous latices, of the polymers. This does not apply of course in the variation where the components (A) and (B) are provided by a single carboxyl/β-hydroxy ester-functional polymer.

Also, in this embodiment, it may be useful in some cases that the pH of the medium is below 2.5 (more preferably below 2.0); this may be effected by treatment of the polymer dispersion (latex) with a cation-exchange resin to remove cations or more simply by adding an appropriate (usually mineral) acid. In other cases, the presence of a metal-ion providing compound for catalysing the esterification may be useful (in which case the pH is often >5.0), the amount used normally not being sufficient for the metal itself to take part in crosslinking (by metal ion crosslinking) to any significant degree. The presence of a catalyst or low pH is, however not essential and crosslinking could be effected e.g. merely as a result of thermal means.

Finally, with regard to this embodiment, it is known from U.S. Pat. No. 4,900,592 that aqueous latices of β-hydroxy ester-functional polymers are crosslinkable under acidic conditions, the crosslinking being said to involve a transesterification mechanism involving only the β-hydroxy ester groups. It is disclosed in this patent that polymerised units of acrylic acid or methacrylic acid may be included in the polymers; however the significant advantage of employing a monomer of formula (1) as claimed herein is not disclosed or implied.

It may be appreciated from the foregoing that crosslinking in coatings derived from the composition of the invention might possibly in some cases take place by more than one type of reaction or mechanism. For example a composition comprising a carboxyl-functional copolymer (as defined for component (A)) and an epoxy resin (for component (B)), while having the primary potential for crosslinking as a result of the reaction between epoxy and carboxyl groups, might also crosslink to some degree by an esterification reaction if the polymer of component (A) also happened to include units a β-hydroxy ester monomer such as hydroxyethyl acrylate. Again, if compositions had the primary potential of crosslinking by an esterification reaction (as described above), or by reaction between epoxide and carboxyl groups (also as described above), and such compositions also included a multivalent metal ion-providing compound for catalysing such crosslinking reactions, there is the further possibility of a degree of crosslinking occurring by metal ion crosslinking (i.e. crosslinking in which the metal ions themselves take part) if the metal catalyst compound is present in sufficient quantity. Alternatively in compositions where metal ion crosslinking is the primary objective, some crosslinking by esterification might also possibly occur if the carboxyl-functional polymer of component (A) also happened to include units of a β-hydroxy ester monomer.

The composition of the invention may optionally include at least one other polymer (i.e. a polymer other than any of the functionalised polymers as described above). This is usually a free radical addition polymer, formed by a free radical addition polymerisation of at least one olefinically unsaturated monomer. However, other types of addition polymers such as polyurethanes or condensation polymers such as polyesters may also be used.

The aqueous compositions of the invention may be advantageously employed as coating compositions (e.g. protective, adhesive, decorative or sealant coating compositions). For this purpose they may be used "as is" or further diluted with water and/or organic solvents, or they may be supplied in more concentrated form by evaporation of water and/or organic components of the liquid medium. As coating compositions, they may be applied to a variety of substrates including wood, metals, glass, cloth, leather, paper, plastics, foam and the like, by any conventional method including brushing, dipping, flow coating, spraying, and the like. The liquid carrier phase is removed (drying) to form a coating. Ambient temperature is usually sufficient to develop the crosslinking but if appropriate the resulting coating can be heated at moderately elevated temperatures. The compositions may contain other conventional ingredients including organic solvents, pigments, dyes, emulsifiers, surfactants, thickeners, heat stabilisers, levelling agents, wetting agents, anti-cratering agents, fillers, sedimentation inhibitors, fire retardants, UV absorbers, antioxidants and the like introduced at any stage of the production process or subsequently.

The compositions usually have a total solids contents of from about 20 to 65% by weight, preferably from about 30 to 60% be weight.

The present invention is now illustrated by reference to the following examples.

In the examples, all percentages, parts, and ratios are on a weight basis unless otherwise specified. The prefix C before an example denotes that it is comparative.

In the examples, the double rub test assesses the solvent resistance of a film which has been derived from a composition by casting on a glass substrate, drying at ambient temperature and ageing for a period of time at ambient or an elevated temperature (as indicated) (cure conditions), and is effected by rubbing the film to and fro (at room temperature) with a rag soaked with the solvent (e.g. methyl ethyl ketone) until the film fails (i.e. is showing through) or until 200 double rubs is achieved before failure, when the film is rated as follows:

200 (0/5): film failed
200 (1/5): film is severely affected
200 (2/5): film is affected
200 (3/5): film is slightly affected
200 (4/5): film is hardly affected
200 (5/5): film is unaffected In the examples the following abbreviations are used:

BA: n-butyl acrylate
MMA: methyl methacrylate
ST: styrene
MAA: methacrylic acid
AA: acrylic acid
B-CEA: β-carboxyethyl acrylate
HEA: 2-hydroxyethyl acrylate
AcAc: acetylacetonate
MEK: methyl ethyl ketone

EXAMPLES C1, C2, 3, C4

These examples concern compositions where crosslinkability is provided an esterification reaction between polymer-bound β-hydroxy ester groups and carboxyl groups, both in the same polymer, the compositions having no added metal catalyst but being of low pH.

Aqueous compositions (Example 3 according to the invention, Examples C1, C2, C4 comparative), were prepared by conventional aqueous emulsion polymerisation of the following monomers in the amounts indicated (see table 1), followed by treatment of the resulting latices with a protonated cation exchange resin (to remove cations to lower their pH to below 2.0) ("Amberlite" 200 CH). The ratio of carboxyl to β-hydroxy ester groups in the compositions was about 1:1.

TABLE 1

| Ex No. | Monomers used (parts by weight) | | | | | | |
|---|---|---|---|---|---|---|---|
| | BA | MMA | ST | HEA | MAA | AA | B-CEA |
| C1 | 37 | 27.6 | 30 | 6 | 4.45 | — | — |
| C2 | 35.4 | 25.4 | 30 | 6 | — | 3.72 | — |
| 3 | 30.4 | 26.2 | 30 | 6 | — | — | 7.44 |
| C4 | 35.3 | 28.7 | 30 | 6 | — | — | — |

It will be noted that the levels of acid monomers were approximately the same on a molar basis (in fact a slight deficiency of the B-CEA being used compared to MAA and AA).

The aqueous latices had solids content of about 40–43 wt %.

The aqueous compositions were tested for MEK solvent resistance (double rub test), with the results shown in Table 2.

TABLE 2

| Ex. No. | MEK Solvent Resistance (Cure Conditions) | | |
|---|---|---|---|
| | 85° C./10 min | 85° C./20 min | 110° C./10 min |
| C1 | 40 | 100 | 200 (2/5) |
| C2 | 50 | 200 (0/5) | 200 (2/5) |
| 3 | 200 (2/5) | 200 (4/5) | 200 (4/5) |
| C4 | 40 | 100 | 200 (0/5) |

The superiority in performance using B-CEA in comparison to using MAA or AA is readily apparent. (NB the crosslinking in Example C4 is probably occurring via a transesterification mechanism involving the β-hydroxy ester groups).

EXAMPLES 5, 6, C7, C8, C9, C10

There examples also concern compositions where crosslinkability is provided by an esterification reaction between polymer-bound β-hydroxy ester groups and carboxyl groups, both in the same polymer, the compositions also including metal ions for catalysing the crosslinking esterification reaction (the level of metal ions being too small for the metal itself to take part to any significant extent in metal ion crosslinking).

Aqueous compositions (Examples 5, 6 according to the invention, Examples C7 to C10 comparative) were prepared by conventional aqueous emulsion polymerisation of the following monomers in the amounts emulsion polymerisation of the following monomers in the amounts indicated (see Table 3). To the resulting latices (about 40% solids content) were added either 0.5% w/w on polymer solids of Cr(acetate)$_3$, or 0.665% w/w on polymer solids of CrCl$_3$.6H$_2$O. The latices were adjusted to pH 6.5. The ratio of carboxyl to β-hydroxy ester groups in the compositions was about 1:1.

TABLE 3

| Ex. No. | Monomers and parts by weight | | | | | | Metal Catalyst | |
|---|---|---|---|---|---|---|---|---|
| | BA | MMA | HEA | B-CEA | AA | MAA | Cr(acetate)$_3$ | CrCl$_3$ · 6H$_2$O |
| 5 | 40.8 | 45.8 | 6 | 7.44 | — | — | 0.5% w/w | — |
| 6 | same polymer latex as in Example 5 | | | | | | — | 0.665% w/w |
| C7 | 45.7 | 45 | 6 | — | 3.27 | — | 0.5% w/w | — |
| C8 | same polymer latex as in Example C7 | | | | | | — | 0.665% w/w |
| C9 | 47.4 | 42.2 | 6 | — | — | 4.45 | 0.5% w/w | — |
| C10 | same polymer latex as in Example C9 | | | | | | — | 0.665% w/w |

The aqueous compositions were tested for MEK solvent resistance (double rub test), with the results being shown in Table 4.

TABLE 4

| Ex. No. | MEK Solvent Resistance (Cure Conditions) | | |
|---|---|---|---|
| | Ambient/4 days | 52° C./2 hrs | 52° C./18 hrs |
| 5 | 35–40 | 50–60 | 200 (3/5) |
| 6 | 200 (2/5) | 200 (2/5) | 200 (4/5) |
| C7 | 25–30 | 50–80 | 200 (1/5) |

TABLE 4-continued

| Ex. No. | MEK Solvent Resistance (Cure Conditions) | | |
|---|---|---|---|
| | Ambient/4 days | 52° C./2 hrs | 52° C./18 hrs |
| C8 | 200 (2/5) | 150 | 200 (1/5) |
| C9 | 15 | 20 | 40–50 |
| C10 | 60 | 90 | 90 |

The superiority in performance using B-CEA in comparison to using MAA or AA is apparent.

EXAMPLES C11, C12, C13, C14, 15, 16

These examples concern compositions where crosslinkability is provided primarily by a reaction between polymer-bound carboxyl groups and the epoxy groups of an added epoxy resin. However some of polymers of the compositions also include units of a β-hydroxy ester monomer, so in these crosslinking may also be occurring to some extent by esterification. The compositions also contained metal ions for catalysing the crosslinking (the level being too small for the metal itself to take part to any significant extent in metal ion crosslinking).

Aqueous compositions (Examples C11 to C14, 15, 16) were prepared by conventional aqueous emulsion polymerisation of the following monomers in the amounts indicated (see Table 5). The resulting latices (about 45% solids content) were adjusted to pH 6 and to them added 0.8% w/w on polymer solids of Al(AcAc)$_3$ (metal catalyst) and then 3.0% w/w on polymer solids of the epoxy resin "Degussa" 126 (a difunctional cycloaliphatic epoxide, viz 7-oxabicyclo [4,1,0]-heptane-3-carboxylic acid 7-oxabicyclo [4,1,0] hept-3-ylmethyl ester). The ratio of carboxyl groups to epoxy groups in the compositions was about 1:1.

TABLE 5

| Ex. No. | Monomers and parts by weight | | | | | | | |
|---|---|---|---|---|---|---|---|---|
| | BA | MMA | HEA | B-CEA | MAA | AA | Al(AcAc)$_3$ | Diepoxide |
| C11 | 48.9 | 46.9 | — | — | 4.45 | — | 0.8% w/w | 3.0% w/w |
| C12*** | 47.4 | 42.2 | 6 | — | 4.45 | — | 0.8% w/w | 3.0% w/w |
| C13 | 47.3 | 49.5 | — | — | — | 3.27 | 0.8% w/w | 3.0% w/w |
| C14** | 45.7 | 45 | 6 | — | — | 3.27 | 0.8% w/w | 3.0% w/w |
| 15 | 43.46 | 49.0 | — | 7.44 | — | — | 0.8% w/w | 3.0% w/w |
| 16* | 40.8 | 45.8 | 6 | 7.44 | — | — | 0.8% w/w | 3.0% w/w |

*same polymer latex as used in Example 5.
**same polymer latex as used in Example C7.
***same polymer latex as used in Example C9.

The aqueous compositions were tested for MEK solvent resistance (double rub test), with the results being shown in Table 6.

TABLE 6

| Ex. No. | MEK Solvent Resistance (Cure Conditions) | | |
|---|---|---|---|
| | Ambient/3 days | 52° C./1 hr | 52° C./20 hrs |
| C11 | 20 | 10 | 30 |
| C12 | 30 | 25 | 60 |
| C13 | 40 | 10 | 80 |
| C14 | 80 | 50 | 200 (1/5) |
| 15 | 100–150 | 50 | 200 (3/5) |
| 16 | 150–200 | 140 | 200 (3/5) |

Blank compositions (i.e. no Al(AcAc)$_3$ or epoxide) were also tested and had MEK solvent resistances of ≦10.

EXAMPLES 17, C18, C19

These examples using the same polymer latices as those used in Examples 5 (for Example 17), C7 (for Example C18), and C9 (for Example C19), concern compositions where crosslinkability is provided by an esterification reaction between polymer-bound β-hydroxy ester groups and carboxyl groups, both in the same polymer, the polymer latices subsequently being adjusted to pH 6.7 (i.e. no deionisation using an ion exchange resin) and no metal ion catalyst being added. In these compositions crosslinking esterification is effected by thermal means only.

The MEK solvent resistance test results are shown in Table 7.

TABLE 7

| Ex. | MEK Solvent Resistance (Cure Conditions) | |
| --- | --- | --- |
| No. | 150° C./30 min | 170° C./30 min |
| 17 | 100 (3/5) | 200 (5/5) |
| C18 | 20–25 | 200 (3/5) |
| C19 | 25–30 | 200 (3/5) |

Once again the superiority in performance using B-CEA in comparison to using MAA or AA is apparent.

EXAMPLES C20 to C23, 24, 25

These examples concern compositions in which crosslinkability is provided primarily by a reaction between polymer-bound carboxyl groups and the epoxy groups of an added epoxy resin. However, the polymers used also include units of a β-hydroxy ester monomer, so the crosslinking may also be occurring to some extent by esterification or etherification. The compositions are also compared with and without the inclusion of a metal ion-providing compound for catalysing the crosslinking (the level, when used, being too small for the metal itself to take part to any significant extent in metal ion crosslinking).

Aqueous compositions (C20 to C23, 24, 25) were prepared by conventional aqueous emulsion polymerisation of the following monomers in the amounts indicated (see Table 8). The resulting latices (about 45% solids content) were treated (in Example C21, C23, 25 only) with 0.05% w/w on polymer solids of Cr(acetate), (Examples C20, C22, 24 did not incorporate the metal catalyst). All the latices had 2.5% w/w of the epoxy resin "Degussa" 126 added thereto. The ratio of carboxyl groups to epoxy groups in the composition was about 1.2:1.

The MEK solvent resistance test results are shown in Table 9.

TABLE 9

| Ex. | MEK solvent Resistance (Cure Conditions) | | |
| --- | --- | --- | --- |
| No. | Ambient/48 hrs | 52° C./2 hrs | 52° C./18 hrs |
| C20 | 10 | 15 | 15 |
| C21 | 10 | 15 | 50 |
| C22 | 10 | 20 | 200 (0/5) |
| C23 | 180 | 40 | 200 (3/5) |
| 24 | 30 | 70 | 200 (3/5) |
| 25 | 200 (4/5) | 200 (2/5) | 200 (4/5) |

The improvement observed by the use of B-CEA in comparison to the use of MAA or AA, in both compositions with and without metal catalyst, is again readily apparent.

EXAMPLES 26, C27, C28

These examples, using the same polymer latices as those used in Example 5 (for Example 26), Example C7 (for Example C27) and Example C9 (for Example C28), concern compositions where crosslinkability is provided primarily by metal ion crosslinking involving the polymer-bound carboxyl groups and an added metal ion-providing compound. However, the polymers of the compositions also include units of a β-hydroxy ester monomer, so crosslinking may also be occurring to some extent by esterification. To the aqueous latices were added 100% of the stoichiometric amount based on polymer carboxylic acid functionality of Ti (AcAc)$_2$ to form the compositions.

The MEK solvent resistance results are shown in Table 10.

TABLE 10

| Ex. | MEK solvent Resistance (Cure Conditions) | |
| --- | --- | --- |
| No. | Ambient/3 days | 85° C./30 min |
| 26 | 200 (3/5) | 200 (3/5) |
| C27 | 105 | 185 |
| C28 | 90 | 110 |

The improved performance of the composition of the invention is again apparent.

EXAMPLES 29, C30, C31

These examples, using the same polymer latices as those used in Example 15 (for Example 29), Example C11 (for Example C30) and Example C13 (for Example C31) concern compositions where crosslinkability is provided by metal ion crosslinking involving the polymer-bound carboxyl groups and an added metal-ion providing compound. (These polymers contained no units of a β-hydroxy ester

TABLE 8

| Ex. | Monomers and parts by weight | | | | | | | Cr (acetate)$_3$ | |
| --- | --- | --- | --- | --- | --- | --- | --- | --- | --- |
| No. | BA | MMA | ST | HEA | MAA | AA | B-CEA | cat | Diepoxide |
| C20 | 37 | 27.6 | 30 | 6 | 4.45 | — | — | — | 2.5% w/w |
| C21 | same polymer latex as in Ex 20 | | | | | | | 0.05% w/w | 2.5% w/w |
| C22 | 35.4 | 25.4 | 30 | 6 | — | 3.27 | — | — | 2.5% w/w |
| C23 | same polymer latex as in Ex C22 | | | | | | | 0.05% w/w | 2.5% w/w |
| 24 | 30.4 | 26.2 | 30 | 6 | — | — | 7.44 | — | 2.5% w/w |
| 25 | same polymer latex as in Ex C24 | | | | | | | 0.05% w/w | 2.5% w/w | monomer). To 10 g of the stirred aqueous latices were added 75% of the stoichiometric mount based on polymer carboxylic acid functionality of Ca(propionate)$_2$ and 0.3 ml concentrated ammonia (specific gravity 0.88) to form the compositions.

The MEK solvent resistance results are shown in Table 11.

TABLE 11

| Ex. No. | MEK Solvent Resistance Cure.: Ambient/3 days |
|---------|----------------------------------------------|
| 29      | 200 (4/5)                                    |
| C30     | 80                                           |
| C31     | 200 (0/5)                                    |

We claim:

1. An aqueous crosslinkable coating composition comprising an aqueous dispersion of:

(A) at least one copolymer, said copolymer being obtainable or derived from the addition polymerisation of 2 or more olefinically unsaturated monomers and bearing lateral carboxyl groups which are provided at least in part by polymerised units in said copolymer of a monomer of Formula (1):

$$CH_2=CR^1-Q-CO_2H \qquad (1)$$

where $R^1$ is H or lower alkyl of 1 to 5 carbon atoms and Q is a non carboxyl-containing spacer group providing a spacer chain of at least 3 atoms, and (B) at least one carboxyl-reactive material for providing crosslinking during and/or after coating formation from the composition in which the polymer-bound carboxyl groups provided by the monomer of Formula (1) take part, and wherein the components (A) and (B) are provided by different and/or the same substance(s).

2. Composition according to claim 1 wherein component (A) is in the form of an aqueous latex.

3. Composition according to claim 1 or claim 2 wherein $R^1$ is H or methyl.

4. Composition according to claim 1 wherein Q is a spacer group of 3 to 8 atoms.

5. Composition according to claim 1 or claim 2 wherein Q has the formula:

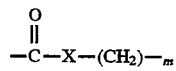 (2)

where X is —O— or —NH— and m is at least 1.

6. Composition according to claim 1 wherein the monomer of Formula (1) has the formula:

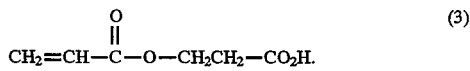 (3)

7. Composition according to claim 1 wherein the monomer of Formula (1) is the sole source of carboxyl functionality in component (A).

8. Composition according to claim 1 wherein at least one copolymer of component (A) is derived from the polymerisation of 1 to 25 weight % of at least one monomer of Formula (1), 0 to 12.5 weight % of one other carboxylic acid functional olefinically unsaturated monomer, and 75 to 99 weight % of at least one non-carboxylic olefinically unsaturated monomer, based on the total weight of monomers used in the polymerisation.

9. Composition according to claim 1 wherein said carboxyl reactive material of component (B) is a polyvalent metal compound for providing polyvalent metal ions for effecting ionic crosslinking with the carboxyl groups.

10. Composition according to claim 1 wherein component (B) is at least one polyepoxide compound for effecting crosslinking by reaction of the epoxide groups with the carboxyl groups, the compound having an average of two or more epoxide groups per molecule.

11. Composition according to claim 10 wherein components (A) and (B) are provided at least in part by the same polymer material, being an addition copolymer of two or more olefinically unsaturated monomers which bears both lateral carboxyl groups and lateral epoxy groups.

12. Composition according to claim 1 wherein component (B) is at least one organic polymer having β-hydroxy ester groups for effecting crosslinking by an esterification reaction.

13. Crosslinked coating obtainable from an aqueous crosslinkable coating composition claimed in claim 1.

14. Method of coating a substrate which comprises applying thereto an aqueous crosslinkable composition claimed in claim 1 and allowing or causing the aqueous phase to become removed to form a coating on the substrate.

15. A coated substrate, wherein the coating on said substrate is obtainable from an aqueous crosslinkable coating composition as claimed in claim 1.

16. In a method of coating a surface, the modification which comprises including in the coating, in polymerized form, a monomer of Formula (1) as defined in claim 1 to improve crosslinking during the formation of the coating or to improve the durability of the coating.

* * * * *